US007062260B2

(12) United States Patent
Vuori

(10) Patent No.: US 7,062,260 B2
(45) Date of Patent: Jun. 13, 2006

(54) FETCHING APPLICATION AND DRIVER FOR EXTENSION DEVICE FROM NETWORK

(75) Inventor: Petri Vuori, Salo (FI)

(73) Assignee: Nokia Corporation, Espoo (FI)

( * ) Notice: Subject to any disclaimer, the term of this patent is extended or adjusted under 35 U.S.C. 154(b) by 386 days.

(21) Appl. No.: 10/402,374

(22) Filed: Mar. 27, 2003

(65) Prior Publication Data

US 2004/0192274 A1 Sep. 30, 2004

(51) Int. Cl.
*H04M 3/00* (2006.01)
*H04M 1/00* (2006.01)
*H04B 1/38* (2006.01)

(52) U.S. Cl. ...................................... 455/418; 455/557

(58) Field of Classification Search ................ 455/418, 455/556.1, 556.2, 557, 419–420, 558–559
See application file for complete search history.

(56) References Cited

U.S. PATENT DOCUMENTS

2003/0220988 A1* 11/2003 Hymel ....................... 709/220
2004/0152457 A1* 8/2004 Goldstein et al. ........... 455/419
2005/0101309 A1* 5/2005 Croome ...................... 455/418

OTHER PUBLICATIONS

U.S. Appl. No. 10/395,012, filed Mar. 21, 2003, Kangas et al.

* cited by examiner

*Primary Examiner*—Benny Quoc Tieu

(57) ABSTRACT

A method and apparatus are provided so that a mobile terminal will obtain an application for an accessory of the mobile terminal from a telecommunications network. The mobile terminal includes an accessory interface, responsive to connection with the accessory, for providing an accessory identification to a processing unit within the mobile terminal. The processing unit makes an accessory application inquiry to an accessory application memory within the mobile terminal. The memory provide information regarding a stored application, and then the processing unit makes an application request to a network, if the information indicates status of the stored application is inadequate.

22 Claims, 2 Drawing Sheets

FETCHING APPLICATION AND DRIVER FOR EXTENSION DEVICE FROM NETWORK

TECHNICAL FIELD OF THE INVENTION

The invention relates to mobile terminals in a telecommunications network, and more particularly to accessory devices connected to the mobile terminals.

BACKGROUND ART

Accessories for mobile equipment are becoming more and more intelligent as usage of new functionality is enabled. Technologies such as Java are providing ways to partly separate accessory development from terminal development and to create flexible platform solutions.

Problems arise with respect to software for an accessory. When an accessory is plugged into a mobile terminal, typical accessories require from ten to a hundred kilobits memory to be available, which increases the cost of the accessory. In the case that the application code and drivers are integrated into the accessory device, the cost of memory is embedded into the bill of materials (BOM) for the accessory. Also, there are always application updates during the product lifetime—an application update for an accessory device requires either re-flashing of the accessory at the point of service, or is impossible (in the case of ROM code). The term “application” refers herein to application code and/or driver software for the accessory device.

As an alternative, coding the accessory software in the terminal, instead of in the accessory, has its own problems. For example, there is no way to support a new accessory in an old terminal. Also, for even an old accessory, software updates are no easier than if the software were integrated with the accessory device.

Hardware platforms including—for example—a selection of different sensors will be available in a few years. This type of device allows an application developer to use the hardware platform as an enabler, and the application can be whatever is invented for that particular platform. The same hardware can be used with several different applications, and functionality is not limited to a fixed application code, as is the case with existing products in accessory devices. Therefore, installation and updating of applications will become increasingly problematic in the future, without new approaches. For example, even if an accessory device is able to be integrated with one application does not mean that it can store additional applications as well.

DISCLOSURE OF THE INVENTION

This invention describes a method and apparatus for fetching the application code and driver software for an accessory device, over a network connection, for example in a General Packet Radio Service (GPRS) network. The fetching can be initiated automatically, or by a user, depending upon the preferred solution. Connecting the accessory device to the terminal for the first time initiates a data call to a predefined location in the network (e.g. a Club Nokia server), and the requested software is downloaded to the terminal. The accessory device preferably points to the correct number/web address from which the code is available. There has not been functionality like this available in terminals.

According to the present invention, a mobile terminal will obtain an accessory application for an accessory of the mobile terminal from a telecommunications network, if necessary. The mobile terminal includes an accessory interface, responsive to connection with the accessory, for providing an accessory identification to a processing unit within the mobile terminal. The processing unit then makes an accessory application inquiry to an accessory application memory within the mobile terminal. The memory provides information regarding a stored application, and then the processing unit makes an application request to a network, if the information is indicative that status is inadequate. This solution relieves the accessory device of memory requirements, while ensuring that the mobile terminal can provide a current application to run the accessory, with minimal requirements of the user.

The mobile terminal initiates a data call right after the external device has been attached to terminal. After termination of the data call, the external device is ready for use.

According to the present method of obtaining an accessory application for an accessory from a telecommunications network, the accessory is identified, a memory is checked to find a status of a stored application corresponding to the accessory, the accessory application is run from the memory if the status is adequate, and the accessory application is downloaded from a network if the status is inadequate.

According to a preferred embodiment of this invention, identification of the accessory is triggered by connecting the accessory to the accessory interface, and so the invention will operate automatically when the accessory is plugged into the mobile terminal. When the mobile terminal’s memory is checked, the status of a stored application may be found to be inadequate if the stored application is absent from the memory, or is merely outdated (e.g. possibly ripe for updating). In either case, the mobile terminal will then, according to this embodiment, place a data call to an address read from the accessory. In other words, the accessory device may advantageously provide to the mobile terminal a phone number, internet locator, or the like, in order to find a location from which the mobile terminal can download the application to the mobile terminal’s memory.

Since a benefit of the present invention is that it reduces memory requirements in the accessory device, it may be advantageous for the accessory to have insufficient memory to store the accessory application. This can significantly reduce the cost of the accessory.

It is expected that the present invention will be implemented even in an accessory that is convertible to a different accessory corresponding to a different application. In other words, a single hardware device can be adapted for more than one accessory purpose. In such a case, a different address can be read from the hardware device, depending upon the purpose to which the device is being adapted. The single device can store one application, while relying upon the mobile terminal to store another application.

BEST MODE FOR CARRYING OUT THE INVENTION

Figure 1:
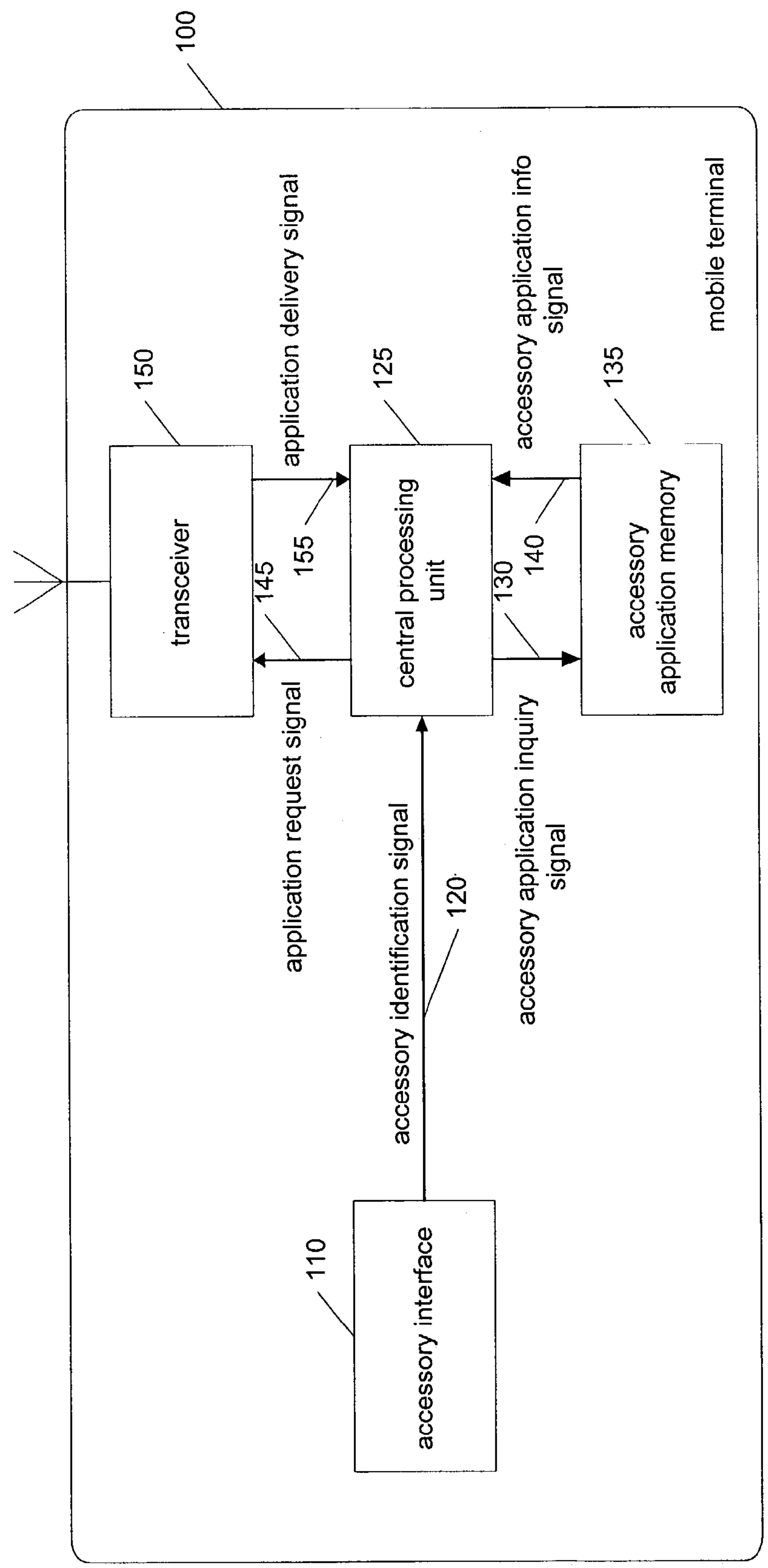
FIG. 1 is a block diagram depicting an embodiment of the present invention.

FIG. 1 shows a best mode for carrying out the invention. The mobile terminal 100 includes an accessory interface 110. This may, for example, be a port for attaching the external accessory device. In any case, the accessory interface 110 will provide an accessory identification signal 120, preferably when the accessory is attached to the interface. The accessory identification signal 120 may indicate a network address from which the application can be downloaded in order to operate the accessory.

A processing unit such as a central processing unit (CPU) 125 within the mobile terminal will receive the accessory identification signal 120, and in response thereto will send an accessory application inquiry signal 130 to an accessory application memory 135 within the mobile terminal 100. Of course, this accessory application memory may simply be the mobile terminal's main memory unit. In any case, the accessory application memory 135 will report back to the CPU 125 with information regarding accessory applications stored in the memory. This information report is represented in FIG. 1 by the accessory application information signal 140.

At this point, the CPU must determine the status of one or more accessory applications stored in the memory, and decide based upon the status whether or not to utilize its transceiver to contact the network. Only if the accessory application information signal lead the CPU to conclude that the status is inadequate will the network be contacted. Otherwise, the application will simply be run from the memory 135. In the case of an inadequate status, the CPU 125 sends an application request signal 145 to the transceiver 150. The transceiver 150 contacts the network according to an address provided by the accessory interface 110; for example, the address could be included in the accessory identification signal 120 or alternatively could be included in a later signal from the accessory interface 110.

The transceiver 150 passes along the downloaded application to the processing unit 125 via an application delivery signal 155. Of course, the downloaded application could also be passed along directly from the transceiver 150 to the accessory application memory 135. In either case, the downloaded application can then be run, in order to use the accessory attached to the accessory interface 110.

According to an advantageous embodiment of the present invention, the transceiver 150 can also be used to find out if a new version of the application is or will be available from the network. This can occur automatically on a regular basis (e.g. monthly), or can occur when triggered by the user. In either case, the status of the stored application will then be affected by availability of the new version; for example, if one or more accessory applications stored in the memory is an old version of a substantially newer version available from the network, then the status of the old version would be inadequate.

Figure 2:
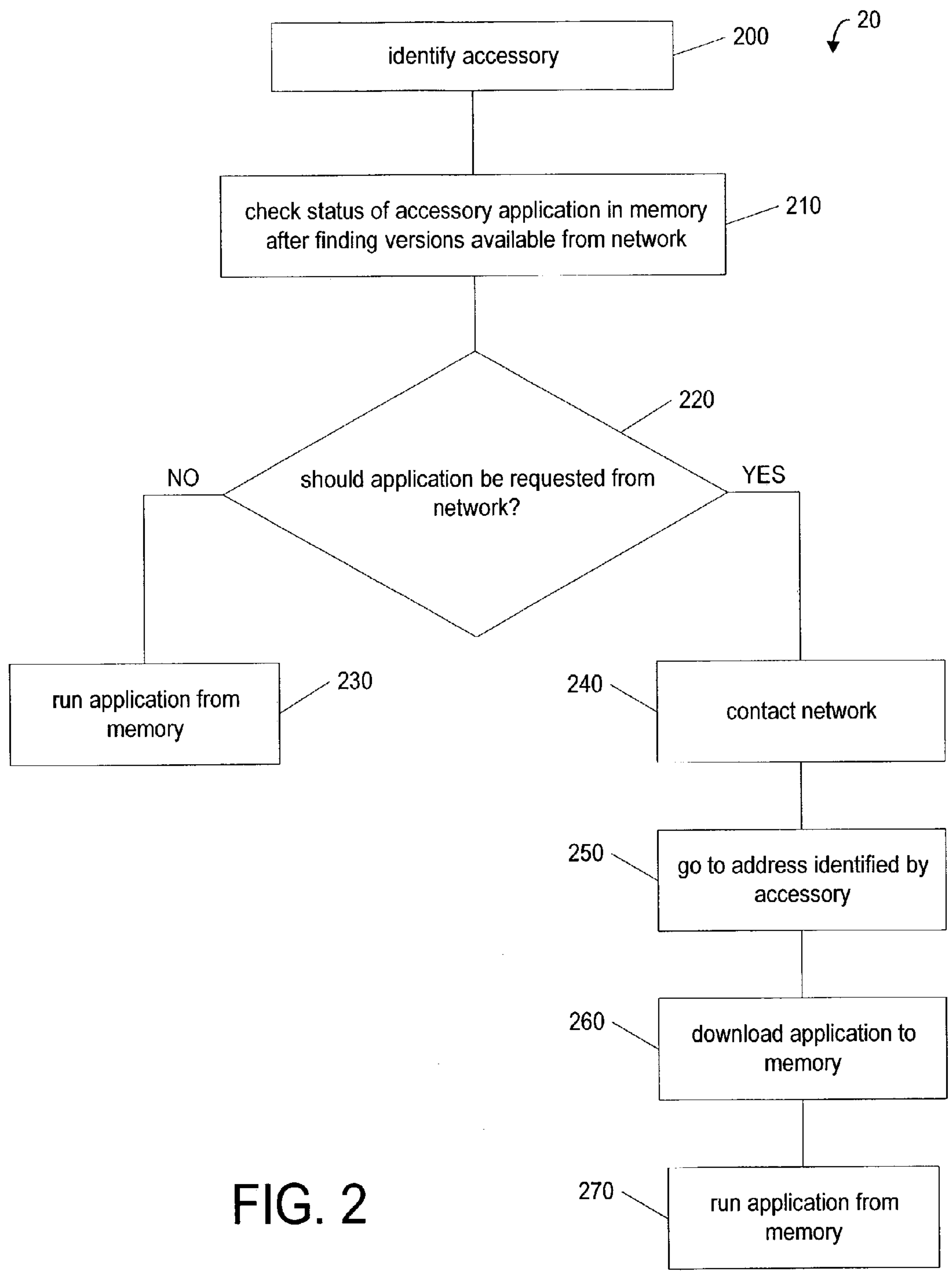
FIG. 2 is a flow chart depicting an embodiment of the present invention.

FIG. 2 is a flow chart that illustrates the method 20 implemented by the mobile terminal diagrammed in FIG. 1. First, the accessory is identified 200. Then a memory is checked 210 so that the status of an accessory application can be determined. A decision 220 must then be made, as to whether an application should be requested from the network. This decision will, of course, be based primarily upon the status determined in step 210, and this status may hinge on factors such as whether the difference between the current date and the date a stored application was created has reached a particular threshold. As indicated in FIG. 2 and mentioned above, the status may also hinge on what versions are known to be available from the network.

If the decision 220 is negative, then the application is simply run from memory 230. On the other hand, if the decision 220 is affirmative, then the network is contacted 240, and an address identified by the accessory is reached 250. This is the address where an application can be downloaded to memory 260. Finally, the application is run 270 from memory, which of course is a step that is very similar to step 230.

It is to be understood that all of the present Figures, and the accompanying narrative discussions of the best mode embodiments, do not purport to be completely rigorous treatments of the method under consideration. A person skilled in the art will understand that the steps and signals of the present application represent general cause-and-effect relationships that do not exclude intermediate interactions of various types, and will further understand that the various steps and structures described in this application can be implemented by a variety of different combinations of hardware and software which need not be further detailed herein.

What is claimed is:

1. A mobile terminal capable of obtaining an application for an accessory of the mobile terminal from a telecommunications network, comprising:

an accessory interface, responsive to connection with the accessory, for providing an accessory identification signal;

a processing unit, responsive to the accessory identification signal, for providing an accessory application inquiry signal; and an accessory application memory, responsive to the accessory application inquiry signal, for providing an accessory application information signal, wherein the processing unit is also for providing an application request signal if the accessory application information signal has a magnitude indicative that a status of a stored application is inadequate, and wherein the mobile terminal further comprises a transceiver responsive to the application request signal, for communicating with the network and receiving an application delivery signal, wherein the status depends at least upon whether the stored application has been present in the accessory application memory for more than a threshold of time.

2. The mobile terminal of claim 1, wherein the accessory identification signal is triggered by connecting the accessory to the accessory interface, or by manual operation of a user after the accessory is connected.

3. The mobile terminal of claim 1, wherein the transceiver is responsive by placing a network connection to an address read from the accessory, and wherein the application delivery signal provides an accessory application downloaded from the address.

4. The mobile terminal of claim 3, wherein the accessory is convertible to a different accessory corresponding to a different accessory application.

5. The mobile terminal of claim 4, wherein a different address is read from the different accessory.

6. The mobile terminal of claim 4, wherein the different accessory application is stored in an accessory memory located in the accessory.

7. The mobile terminal of claim 1, wherein if the status is inadequate then the memory is for storing the accessory application downloaded from the address.

8. The mobile terminal of claim 1, wherein the accessory has insufficient memory to store the accessory application.

9. The mobile terminal of claim 1, wherein the application is obtained either automatically or when a user wants the application to be obtained.

10. The mobile terminal of claim 1, wherein the transceiver is also for finding out if a new version of the application is or will be available from the network, and wherein the status of the stored application is affected by availability of the new version.

11. The mobile terminal of claim 10, wherein the mobile terminal is configured to find out the availability automatically on a regular basis or when a user chooses.

12. A method of obtaining an application for a mobile terminal accessory from a telecommunications network, comprising the steps of:

identifying the accessory, checking a memory to determine a status of a stored application corresponding to the accessory, running the accessory application from the memory if the status is adequate, downloading the accessory application from a network if the status is inadequate, wherein the status depends at least upon whether the stored application has been present in the accessory application memory for more than a threshold of time.

13. The method of claim 12, wherein the method is triggered by connecting the accessory to the accessory interface, or by manual operation of a user after the accessory is connected.

14. The method of claim 12, wherein the step of downloading the accessory application entails placing a network connection to an address read from the accessory.

15. The method of claim 14, wherein the accessory is convertible to a different accessory corresponding to a different accessory application.

16. The method of claim 15, wherein a different address is read from the different accessory.

17. The method of claim 15, wherein the different accessory application is stored in an accessory memory.

18. The method of claim 12, further comprising the following steps if the status is inadequate:

storing the accessory application downloaded from the network in the memory, and running the accessory application from the memory.

19. The method of claim 12, wherein the accessory has insufficient memory to store the accessory application.

20. The method of claim 12, wherein the application is obtained either automatically or when a user wants the application to be obtained.

21. The method of claim 12, further comprising the step of finding out if a new version of the application is or will be available from the network, and wherein the status of the stored application is affected by availability of the new version.

22. The method of claim 21, wherein the step of finding out is automatically performed on a regular basis or when a user chooses.

* * * * *